Patented Nov. 7, 1944

2,362,307

UNITED STATES PATENT OFFICE 2,362,307

CYCLIC DIETHERS

John J. Ritter, Yonkers, N. Y., assignor to Standard Oil Development Company, a corporation of Delaware No Drawing. Application May 11, 1940,
Serial No. 334,668

5 Claims. (Cl. 260—338)

This invention relates to a process for the production of meta-dioxanes otherwise known as cyclic diethers or cyclic dioxides from low molecular weight aliphatic, alicyclic mono- or polyolefins or mixtures of these with saturated hydrocarbons by condensing them with aldehydes in the presence of acidic catalysts. The meta-dioxanes are colorless mobile liquids, the lower molecular weight being somewhat water-soluble and the solubility decreases with increasing molecular weight of the meta-dioxane, and they are completely soluble in ether and naphtha.

Cyclic diethers have been previously prepared by reacting such compounds as aldehydes or ketones with glycols or other polyhydric alcohols in the presence of an etherification catalyst. This reaction is carried out by heating substantially equimolecular proportions of the reactants at between 100 and 200° C. in the presence of suitable catalysts. When prepared from glycols and aldehydes the products are too expensive because of the costly raw materials involved.

According to the present invention, olefins and aldehydes are condensed in the presence of aqueous sulfuric acid solutions of between 10 and 85% concentration at temperatures and pressures capable of maintaining an appreciable concentration of olefins in the reaction mixture. Acids other than sulfuric acid of the polybasic oxygenated type, such as phosphoric acid, may be used as the catalyst in the process of this invention. In bringing about this reaction, the mol ratio of formaldehyde to olefin should be kept at two mols or more formaldehyde per mol of olefin. The mol ratio of at least 2 mols aldehyde per mol of olefin is maintained in order to suppress the formation of glycols which are present in minute amounts even when the aldehyde-olefin ratio is greater than 2. The principal constituent in the reaction product resulting from the process of this invention under the conditions described is a meta-dioxane. Dilute acid should be used where possible in order to prevent the formation of polymers from the olefins. When dilute acids are spoken of, acids of less than 85% concentration are contemplated. In general, primary olefins require acids of from 50% to 85% concentration for the reaction and polymerization is not troublesome, that is, using propylene 83% acid is quite satisfactory at room temperature. The more reactive secondary and tertiary olefins require a correspondingly more dilute acid in order to prevent polymerization of the original olefin and sulfation and polymerization of the product, thus isobutylene can be reacted with 10-40% acid and butene-2 with 40-60% acid. The reaction may be brought about by passing an olefin, mixtures of olefins or mixtures of olefins and saturated hydrocarbons either in liquid or vapor state into a slurry of aldehyde, such as para-formaldehyde, in sufficient sulfuric acid to make the mixture mobile, or the aldehyde can be suspended in a high boiling inert diluent, such as saturated hydrocarbon, for example, white oil with catalytic amounts of sulfuric acid added thereto and the olefin passed into this mixture. Room temperature or slightly above is the preferred temperature; however, the reaction may be speeded up by increases in temperature. The best results are obtained by carefully selecting both temperature and acid strength for the particular olefin employed. The time of reaction varies with acid strength and temperature and may take from a few minutes to several hours. Branched olefins react more rapidly than straight chain olefins. When using a slurry of aldehyde and acid, the unreacted hydrocarbons and reaction product being practically insoluble in the aqueous acid, stratify therefrom on standing and may be removed by decantation. The meta-dioxane may be recovered from the upper layer either by distilling off the unreacted hydrocarbons leaving the reaction product as a residue or by removing the meta-dioxane from the decanted solution by solvent extraction with glycol, phenol or similar solvents and recovered from its solution in the solvent by known methods. The acid may be reused and if an excess of aldehyde is employed, it remains in the acid layer and is conserved. Where the aldehyde is suspended with sulfuric acid in a high boiling hydrocarbon, the acid may be removed as the lower layer after stratification and the meta-dioxane separated from the high boiling hydrocarbon by solvent extraction or distillation.

Pure meta-dioxanes can be produced by this method from pure olefins such as ethylene, propylene, the various butylenes or amylenes and the like. Mixtures, however, such as obtained from cracked gases or liquid cracked distillates, can be used to prepare mixed meta-dioxanes. Furthermore, various diolefins can be employed such as butadiene, isoprene and the like. In these cases the reaction may take place only at one of the double bonds or it may be caused to take place at both. Cyclic olefins, such as cyclo hexene, may also be used to prepare these compounds.

The reaction ordinarily occurs at room temperature as previously stated, but temperature and acid strength are related and a slightly higher temperature is preferably employed with slightly lower acid strength and vice versa. The temperature of reaction will ordinarily be found to lie between 10 and 40° C. The olefins or mixtures may be bubbled through the acid-aldehyde mixture or vigorously shaken therewith or agitated by other mechanical means. Or, a mixture of olefin and aldehyde, or hydrocarbons containing olefins and aldehyde, can be passed into the acid and then agitated. The method may be utilized as a continuous process. Since the reaction is exothermic, cooling methods known to the art may be used to dissipate the heat generated.

The products may be designated as meta-dioxanes, 1,3-dioxanes, methylene diethers, cyclic diethers or cyclic acetals. These products generally are oil-soluble, while their water-solubility depends on the molecular weight; the lower members being the more water-soluble. They may be used as solvents or solvent ingredients for resins, cellulose esters and ethers, fats and oils. They may be used as motor fuel ingredients, for example 5 to 50% may be employed in gasoline as an anti-detonation improver. The meta-dioxanes make likewise useful intermediates for various chemical reactions.

The following examples are given as illustrating the invention:

Example 1

15 parts by weight of para-formaldehyde were added to an agitated body of 100 parts by weight of 60% sulfuric acid and the mixture cooled to 10° C. Stirring of the cooled mixture was continued while 56 parts by weight of diisobutylene were added drop by drop over a period of 3 hours. The temperature was maintained at 10° C. and agitation of the mixture was continued for 1 hour after the last addition of the diisobutylene. On standing, the mixture separated into an upper layer of reaction product and a lower layer of aqueous acid. The two layers were separated by decantation. The reaction product was then neutralized, dried and fractionated, yielding 25 parts by weight of unreacted diisobutylene and 21 parts by weight of $C_{10}H_{20}O_2$.

Example 2

200 ccs. isobutylene were shaken for 8 hours at room temperature in a closed vessel capable of withstanding pressures of several atmospheres with 125 grams para-formaldehyde and 25 grams of 25% sulfuric acid. At the end of the reaction period agitation was stopped. On standing, the mixture separated into an upper layer of reaction product and a lower layer of aqueous acid. The two layers were separated by decantation. The reaction product in the top layer was purified by distillation yielding 141 grams of 4,4, dimethyl meta-dioxane.

Example 3

700 parts by weight of pentene-2 were shaken with 600 parts by weight para-formaldehyde and 120 ccs. of 83% sulfuric acid for one hour. The products of reaction were separated and purified by distillation yielding 1216 parts by weight of crude 4 ethyl 5 methyl meta-dioxane which corresponds to 95% of the theoretical yield.

Example 4

360 parts by weight of trioxymethylene were agitated for 46 hours at room temperature with 760 parts by weight isobutylene and 375 parts by weight of 40% phosphoric acid. The trioxymethylene was completely reacted and 389 parts by weight of isobutylene absorbed. The products of reaction were separated and purified by distillation, yielding 402 parts by weight of 4,4 dimethyl meta-dioxane.

The aldehyde, preferably formaldehyde, may, however, be acetaldehyde, furfuraldehyde, benzaldehyde, mono- or dichloroacetaldehyde, or compounds, such as trioxymethylene and paraldehyde, which decompose to yield an aldehyde.

The above disclosure and examples are given for the purposes of illustration only and are not to be construed as in any way limiting the invention.

What is claimed is:

1. The method of making 4-ethyl-5-methyl metadioxane which consists in condensing at room temperature 1 mol pentene-2 and 2 mols formaldehyde in the presence of 83% aqueous sulfuric acid and recovering the 4-ethyl-5-methyl metadioxane.

2. A method for the preparation of meta-dioxanes from straight chain olefin-hydrocarbons which comprises condensing one mol of said straight chain olefin-hydrocarbons with two mols of an aldehyde in the presence of an aqueous polybasic oxygenated mineral acid of from 50–85% concentration and recovering the metadioxanes formed.

3. A method for the preparation of meta-dioxanes from straight chain olefin-hydrocarbons of from 2–10 carbon atoms in the molecule which comprises condensing one mol of said olefin hydrocarbons with two mols of an aldehyde in the presence of an aqueous polybasic oxygenated mineral acid of from 50–85% concentration and recovering the metadioxanes formed.

4. A method for the preparation of meta-dioxanes from straight chain olefin-hydrocarbons of from 2–10 carbon atoms to the molecule which comprises condensing one mol of said olefin-hydrocarbons with two mols of an aldehyde in the presence of aqueous sulfuric acid of from 50–85% concentration and recovering the metadioxanes formed.

5. A method for the preparation of meta-dioxanes from straight chain olefin-hydrocarbons of from 2–10 carbon atoms per molecule which comprises condensing one mol of said olefin-hydrocarbons with two mols of formaldehyde in the presence of aqueous sulfuric acid of from 50–85% concentration and recovering the metadioxanes formed.

JOHN J. RITTER.